(12) United States Patent
Niemann et al.

(10) Patent No.: US 8,773,152 B2
(45) Date of Patent: Jul. 8, 2014

(54) DEVICE FOR DETECTING PHYSICAL STATE VARIABLES OF A MEDIUM

(75) Inventors: Thomas Niemann, Delmenhorst (DE); Torsten Eggers, Bremen (DE)

(73) Assignee: Hella KGa Hueck & Co., Lippstadt (DE)

( * ) Notice: Subject to any disclaimer, the term of this patent is extended or adjusted under 35 U.S.C. 154(b) by 166 days.

(21) Appl. No.: 13/185,134

(22) Filed: Jul. 18, 2011

(65) Prior Publication Data

US 2012/0019271 A1 Jan. 26, 2012

(30) Foreign Application Priority Data

Jul. 21, 2010 (DE) .......................... 10 2010 031 719

(51) Int. Cl.
*G01N 7/00* (2006.01)
*G01L 9/16* (2006.01)
(52) U.S. Cl.
USPC ............................ 324/722; 73/31.04; 73/754
(58) Field of Classification Search
USPC .................................. 324/722; 73/754, 31.04
See application file for complete search history.

(56) References Cited

U.S. PATENT DOCUMENTS

| 6,308,574 B1 * | 10/2001 | Klun et al. ........................ 73/706 |
| 2005/0115328 A1 * | 6/2005 | Hayashi et al. ................... 73/754 |
| 2010/0043530 A1 * | 2/2010 | Elian et al. ..................... 73/31.06 |

FOREIGN PATENT DOCUMENTS

| DE | 102005045380 A1 | | 4/2006 |
| DE | 102008032309 | * | 6/2006 |
| DE | 102008032309 A1 | | 6/2009 |
| DE | 102008032309 A1 | | 1/2010 |

OTHER PUBLICATIONS

Stuermann et al., Sensor arrangement for measuring condition of liquid, particularly oil in motor vehicle engine of motor vehicle, has contact and sensor area in component, Jan. 2010, Machine translation attached.*

* cited by examiner

*Primary Examiner* — Melissa Koval
*Assistant Examiner* — Farhana Hoque
(74) *Attorney, Agent, or Firm* — Muncy, Geissler, Olds & Lowe, P.C.

(57) ABSTRACT

In the case of a device for detecting physical state variables of a medium, such as pressure or temperature, for example, of a liquid, comprising at least one measuring sensor, which is connected to at least one electrical conductor so as to transmit signals, wherein at least one section of the conductor, which encompasses the sensor, is embedded in a casting compound, the casting compound is embodied, according to the invention, from at least one casting core and a casting jacket, which encloses the casting core, and provision is made in the casting compound for at least one recess for a media-conducting access to a contact surface of the sensor.

8 Claims, 2 Drawing Sheets

DEVICE FOR DETECTING PHYSICAL STATE VARIABLES OF A MEDIUM

Figure 1:
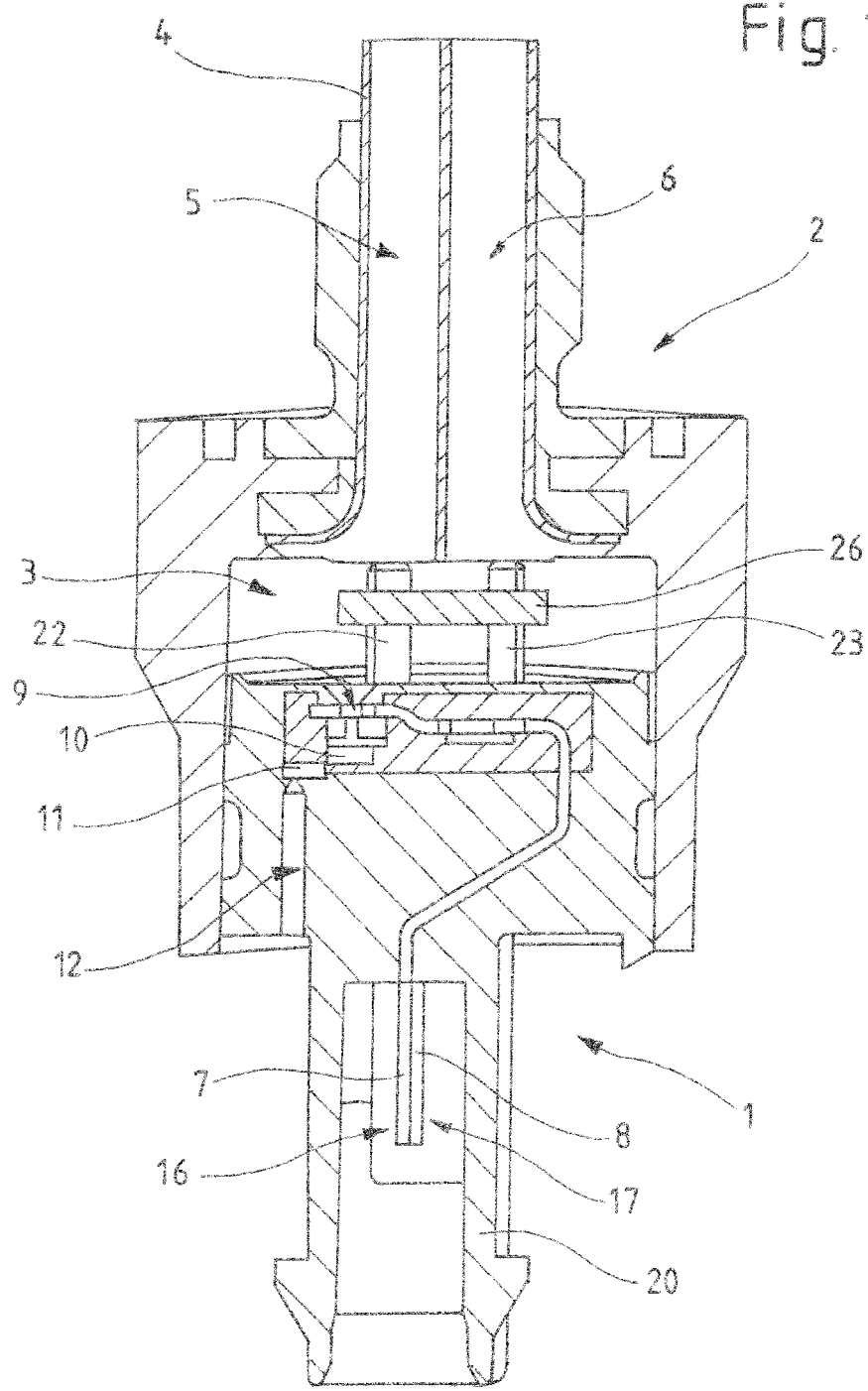

The invention relates to a device for detecting physical state variables of a medium, such as pressure or temperature, for example, of a liquid, comprising at least one measuring sensor, which is connected to at least one electrical conductor so as to transmit signals, wherein at least one conductor section of the conductor, which encompasses the sensor, is embedded in a casting compound.

Devices of the afore-identified species can be arranged, among others, in a liquid container or in a supply line, respectively, which is pressurized and which guides a liquid or gaseous medium, so as to detect the state variables of the medium and to thus be able to draw conclusions to certain characteristics of the medium.

Such a device is known, for example, from DE 10 2008 032 309 A1. The device described therein is used, for example, for measuring the oil pressure and the oil temperature in an oil duct, in particular of a motor vehicle engine. To detect the state variables of the medium, the device encompasses at least one measuring sensor, which is connected to at least one electrical conductor so as to transmit signals. At least one conductor section of the conductor, which encompasses the sensor, is thereby embedded in a casting compound, wherein the sensor itself is arranged outside of the casting compound, so that the medium can flow around the contact surface, which detects the measured variables, of said sensor. To be able to ensure a reliable function of the device, a media-tight prepackaging of the sensor as well as of the electronic components, which are required in addition to the measuring sensor, are typically indispensible in a sensor module in the case of the known devices. The prepackaging, however, is relatively extensive, which has a negative effect on the production of the known devices.

The invention is based on the object of creating a device of the afore-identified species and a method for producing a device, in the case of which an extensive prepackaging of components is avoided and the production is thus simplified.

According to the invention, the solution of the object takes place by means of a device comprising the features of patent claim 1 and by means of a method comprising the features of patent claim 10. Advantageous further developments and embodiments of the invention are in each case specified in the subclaims, which are dependent thereon.

In the case of a device for detecting physical state variables of a medium, such as pressure or temperature, for example, of a liquid, comprising at least one measuring sensor, which is connected to at least one electrical conductor so as to transmit signals, wherein at least one section of the conductor, which encompasses the sensor, is embedded in a casting compound, provision is made according to the invention for the casting compound to be embodied of at least one casting core and a casting jacket, which encloses the casting core, and for at least one recess for a media-conducting access to a contact surface of the sensor to be provided at the periphery of the casting compound.

Due to the embodiment of the device according to the invention, provision is made for already embedding the measuring sensor and possible further electronic components in the separately created casting core of the casting compound together with a section of a conductor, which ensures the current supply, at least area by area. The casting core, together with the conductors, is then furthermore enclosed or accommodated, respectively, by the casting jacket, which embodies the outer dimensions of the device. A recess, which ensures a media-guiding connection to a contact surface of the sensor and which projects into the interior of the casting compound, is thereby embodied at the periphery of the casting compound. An access to the electrical contact surfaces of the conductors is furthermore embodied in the connection area. An advantageously simple production of the device according to the invention is attained through this, wherein the relatively extensive prepackaging of the electronic components or the use of an inner seal, respectively, is avoided in the device at the same time. Provision is made for the wall surfaces of the recess to preferably be embodied by the casting material, which embodies the casting jacket, wherein the wall surfaces can reach in particular to the contact surface of the measuring sensor, which detects the measured variables.

According to a further development of the invention, provision is advantageously made for the recess in the casting compound to reach to a surface area of the conductor section, which is embedded in the casting core, wherein the conductor section encompasses a material aperture for the medium, and the sensor is arranged on a surface of the conductor section, which faces away from the medium. A measuring chamber, in which only static pressures prevail in an advantageous manner and in which a relatively accurate pressure measurement can thus take place with the help of the measuring sensor, can thereby in particular be embodied on the surface of the conductor section, which faces away from the medium, in the area of the measuring sensor. In this embodiment, the contact surface of the measuring sensor forms at least a partial surface of the measuring chamber wall. Preferably, the recess in the casting compound and the material aperture in the conductor are arranged on an axis or coaxially, respectively, in particular for an advantageous passage of the medium into the measuring chamber.

Preferably, the sensor with its contact surface is arranged so as to cover the aperture on the surface of the conductor, which faces away, which represents an advantageous form of the orientation of the sensor and the contact surface thereof. A relatively simple and accurate detection of the pressure by means of the sensor is ensured with the direct arrangement of the contact surface on an opening of the material aperture in the conductor. An advantageously sealing contact between the surface of the conductor, which faces away from the medium, and the contact surface of the sensor, can furthermore be established, so that an unintentional entry of the medium, which is to be measured, into the interior of the casting core via the joining area, is avoided in an advantageous manner. The aperture, which is embodied in the conductor, can encompass a circular or also a rectangular cross section, in particular, wherein the recess in the casting compound can have a similar or differing geometric embodiment.

A further development of the invention provides for a circuit carrier, on which further electronic components are arranged to be arranged on the conductor. The use of a circuit carrier, such as a printed circuit board, for example, has the advantage that the electronic components, which are further required in addition to the measuring sensor for operating the device, can be interconnected in a relatively simple manner among one another on the one hand. On the other hand, a simplified connection of the circuit carrier to the conductors of the device according to the invention, which ensure the current supply, is then created. The circuit carrier is connected in a form-locking manner, in particular, to the conductors, which are oftentimes embodied as punch or metal grid, for example by means of a pressing process. The structurally or electrically conducting connection of the electronic components to the circuit carrier, which is embodied as a printed circuit board, can take place with the help of the process of conductive gluing or wire bonding.

The measuring sensor is, in particular, a part of a sensor comprising measuring sensors, which detect different measured variables, which has the advantage that a plurality of measuring sensors can be connected by means of the contact surface, which is in contact with the medium, so as to transmit signals. It is likewise possible to provide for a plurality of contact surfaces, instead of for only a single contact surface, wherein each contact surface is assigned to a respective measuring sensor. In this context, each individual contact surface of the different sensors can have contact to the medium, in each case via a separate recess in the casting compound. The sensor, which is accommodated within the casting compound, can be a combined sensor, for example, which is suitable for detecting the pressure, which is applied in the medium, or the temperature of the medium.

Preferably, provision is made for a further pressure sensor for pressure measured variables, the contact surface of which is connected to the atmosphere so as to at least conduct pressure. For this purpose, the pressure sensor, which is also at least partially accommodated in the casting core, is connected to the atmosphere via a duct, which is embodied in the casting jacket, so as to conduct pressure. An advantageous registration of the absolute pressure, which is required, in particular, to be able to calibrate the measuring sensor, which is in contact with the liquid medium, if necessary, or to be able to correlate the pressure, which is measured relatively by means of the measuring sensor, respectively, in a corresponding manner, is carried out with the help of the pressure sensor. The inlet of the duct in the casting compound can thereby be sealed, in particular, by means of a membrane, whereby in particular the penetration of moisture or the contamination of the duct can be avoided in an advantageous manner. It goes without saying that the pressure sensor is also connected to the conductors of the device according to the invention, which embody a punch grid, so as to transmit signals. The duct inlet, which establishes the connection to the atmosphere, is provided in particular on the side of the device, which faces away from the measuring room, in the area of a plug-in cage, which is embodied by means of the casting jacket and which accommodates the electrical connections.

At least one of the conductors furthermore encompasses a conductor strand, which projects from the casting compound, by means of which the electrical characteristics of the medium can be detected in an advantageous manner and by means of which certain parameters, such as the ethanol concentration in fuels, for example, can be determined. The quality of the ethanol, which is added to the fuel, can furthermore also determined. Preferably, the device according to the invention encompasses a plurality of such conductor strands, which project from the casting compound. In particular, the conductor strands project into a measuring room, which is to be embodied from partial areas of the device according to the invention, for example, where the medium, which is to be examined, is typically present. The measuring room is thereby embodied by means of the device according to the invention and by means of a flange body, which is to be connected to the device. The conductor strands projecting from the casting compound are preferably structured physically or chemically in their outlet area out of the casting compound, whereby the permeation of the medium into the interior of the device can be avoided and an advantageous media tightness can thus be ensured. For the purpose of an improved vibration resistance, the ends of the conductor strands can be interconnected via a holding ring, which is made of plastic.

According to another further embodiment of the invention, provision is made for the casting compound to be embodied from a material, which encompasses media-resistant characteristics, wherein a thermoplast, in particular a partially aromatized polyamide, can preferably be used. In addition to its resistance against aggressive media, the use of such a plastic according to the invention also has the advantage that it can be processed by means of advantageous production methods. In particular, an injection molding method can be used for this, which has the advantage that the periphery of the casting jacket must not be reworked.

In the case of a motor vehicle, for which independent protection is requested, provision is made for the motor vehicle to encompass a device comprising the above-described features. The device according to the invention is thereby specifically used in lines of a motor vehicle, which guide oil or fuel, for example. Through this, corresponding conclusions can be made, in particular, about the existing state variables or characteristics, respectively, of the medium, which is guided in the lines. A specific control by means of the vehicle electronics can then take place as a function of the detected data.

Provision is furthermore made for a method for producing a device according to one of the preceding claims, for which independent protection is also requested, in the case of which at least one measuring sensor is fasted to at least one conductor, at least one conductor section, which is equipped with the sensor, is at least partially injection molded and a casting core comprising a sensor, which is at least partially embedded therein, is created, and the conductor section, which is equipped with the casting core, is subsequently finally overmolded and a casting jacket is created, wherein a recess, which embodies the access from the periphery of the casting jacket to the sensor, is kept free by means of a molded part.

With the help of such method steps according to the invention, it is possible to create a device, within which a measuring sensor, which detects at least one state variable, is accommodated in an advantageous manner, so as to form a seal, and has access to the medium at the same time. An extensive prepackaging of the measuring sensor within a sensor module, which must first be embodied separately, for example, is not necessary in an advantageous manner, whereby the production is simplified. The measuring sensor or measuring sensors, respectively, which is/are used and possible further electrical components are thereby assembled on a plurality of conductors, which embody a punch grid, and is/are connected to the conductors so as to transmit signals, such as by means of conductive gluing or wire bonding, for example. The conductors, which are equipped with the measuring sensor and the electrical components, which are also arranged thereon, then obtain a fixed structural arrangement relative to one another by means of the overmolding. If necessary, provision can thereby be made for a part of the electronic components to be assembled on a printed circuit board, which, in turn, is connected to the punch grid. After the production of the casting core, wherein it is ensured that the access hole to the contact surface of the sensor is kept free across a large area, the casting core as well as in particular all of the conductors are finally overmolded and a casting jacket is created, wherein at least one recess, which embodies the access to the sensor, is kept free, in particular by means of a molded part, which is provided for this purpose. In the case of the two-stage production of the device according to the invention, it is thus always ensured that the medium has access to the contact surface of the at least one measuring sensor.

A further development of the method according to the invention provides for at least a partial area of the sensor, which detects its measured variables, to be brought into contact with an opening of an aperture, which is created in response to the prefabrication, in one of the conductors so as to form a seal, and for the molded part to be attached to the opposite opening of the conductor aperture for embodying the recess in response to the overmolding. The arrangement of the contact surface on an opening of an aperture, which had previously been created in a conductor, and the subsequent overmolding of the sensor and of the corresponding conductor section has the advantage that a relatively high tightness between the contact surface and the conductor surface, which is in contact with the contact surface of the sensor, can be ensured in response to such a production. In so doing, a permeation of the medium via the connecting or joining area, respectively, into the interior of the device, in particular to the casting core, is virtually eliminated.

Figure 2:
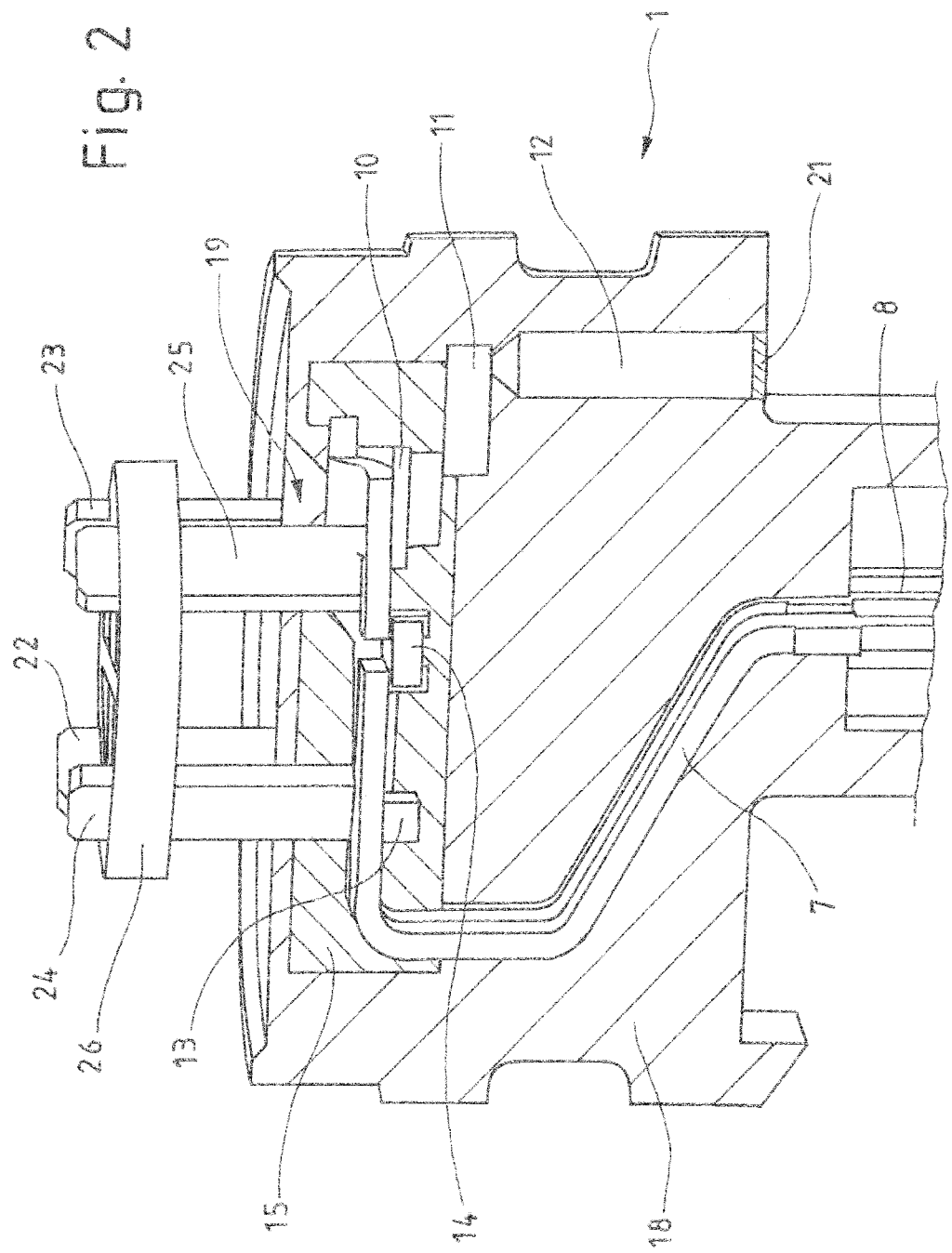

An exemplary embodiment of the invention, from which further inventive features result, is illustrated in the drawing:

FIG. 1 shows a perspective view of the device according to the invention in combination with a flange body, which embodies the measuring room for the medium, in a sectional view and FIG. 2 shows a partial view of the device according to the invention in a sectional view.

1 identifies a device for detecting the state variables of a medium, which is connected to a flange body 2 so as to form a seal such that a measuring room 3 is embodied in an area between these components. The flange body 2 encompasses in particular a supply connection 4 comprising ducts 5, 6, via which a part of the medium is redirected continuously from a non-illustrated supply line into the measuring room 3. A continuous monitoring of the state variables of the medium is thus possible. The device 1 encompasses, in particular, a plurality of conductors 7, 8, which are embodied as punch grid, wherein a conductor 7 encompasses a hole-like material aperture 9, the one opening of which is closed by a contact surface of a measuring sensor 10 so as to form a seal. The device 1 encompasses a further pressure sensor 11, which is connected to the atmosphere for detecting the absolute pressure via a duct 12 so as to conduct pressure.

To avoid the direct contact of the measuring sensor 10, of the pressure sensor 11 and of the further electrical components 13, 14 with the medium, which is to be monitored, these components and predetermined sections of the conductors 7, 8, which are assigned in each case, are virtually enclosed or embedded, respectively, by a casting core 15, as can clearly be seen from FIG. 2. However, the casting core 15, which is embodied from a thermoplast, for example, is not embodied in the area of the hole-like material aperture 9, whereby the access to the contact surface of the measuring sensor 10 is ensured. A casting jacket 18, which almost completely encloses the casting core 15 as well as the electrical connections 16, 17 (FIG. 1) of the conductors 7, 8 and which is made of a media-resistant material, is subsequently embodied around the casting core 15. A recess 19, in particular in the shape of a funnel, which is assigned to the material aperture 9, is thereby embodied by means of the casting jacket 18. The wall surface or wall, respectively, of the recess 19, which is preferably molded onto the surface of the conductor 7 to the area of the opposite opening of the material aperture 9, is thereby embodied, in particular by the casting jacket itself. At the same time, a plug-in cage 20, which accommodates the electrical connections 16, 17 and onto which or via which, respectively, a plug of an electrical connecting line can be slid in an advantageous manner, is also embodied by means of the casting jacket 18. The inlet of the duct 12, via which a pressure-conducting connecting of the pressure sensor 11 to the atmosphere is created, is provided in particular in the area next to the plug-in cage 20 in the casting jacket 18. The inlet of the duct 12 is preferably sealed or closed, respectively, by means of a flexible and thus pressure-conducting membrane 21. In particular, four conductor strands 22 to 25, which are connected to the conductors 7, 8, furthermore project from the casting jacket 18 into the measuring room 3 for the medium. The conductor strands 22 to 25 have the function of electrodes, whereby the electrical characteristics of the medium, which is to be measured, can be determined, such as, for example, the ethanol concentration or the ethanol quality, respectively, in fuels. The upper ends of the conductor strands are connected to one another via a holding ring 26, which is made of plastic, whereby an advantageous vibration resistance thereof is attained.

The method, which is converted in response to the production of the device 1, is a two-stage production process, which runs immediately one after the other.

The invention claimed is:

1. A device for detecting physical state variables of a medium, comprising:
    at least one sensor, which is connected to at least one electrical conductor so as to transmit signals,
    wherein at least one section of the conductor, which encompasses the sensor, is embedded in a casting compound, the casting compound is embodied from at least one casting core and a casting jacket, which encloses the casting core,
    wherein at least one recess is disposed in the casting compound for a media-conducting access to a contact surface of the sensor,
    wherein the recess reaches to a surface area of the embedded conductor section, the conductor section encompasses a material aperture for the medium, and the sensor is arranged on a surface of the conductor section, which faces away from the medium, and
    wherein the sensor with its contact surface is arranged so as to cover the aperture on the surface of the conductor, which faces away so as to form seal.

2. The device according to claim 1, wherein a circuit carrier, on which further electronic components are arranged, is arranged on the conductor.

3. The device according to claim 1, wherein the sensor is part of a sensor comprising measuring sensors, which detect different measured variables.

4. The device according to claim 1, wherein provision is made for a further pressure sensor for pressure measurement, the contact surface of which is connected to the atmosphere so as to at least conduct pressure.

5. The device according to claim 1, wherein at least one of the conductors encompasses a conductor strand, which projects from the casting compound.

6. The device according to claim 1, wherein the casting jacket is embodied of a material, which encompasses media-resistant characteristics.

7. A motor vehicle comprising a device according to claim 1.

8. A method for producing a device according to claim 1, the method comprising: connecting at least one measuring sensor to at least one conductor so as to transmit signals;
    at least partially overmolding at least one conductor section, which is equipped with the sensor; creating a casting core comprising a sensor, which is at least partially embedded therein, subsequently overmolded the conductor section, which is equipped with the casting core; and creating casting jacket, wherein a recess, which embodies the access to the sensor, is kept free by means of a molded part, wherein at least a partial area of the sensor, which detects its measured variables, is brought into contact with an opening of an aperture, in one of the conductors so as to form a seal, in such a way that the sensor is arranged on a suface of the conductor section, which faces away from the medium.

\* \* \* \* \*